United States Patent
Luo et al.

(10) Patent No.: US 10,831,861 B2
(45) Date of Patent: Nov. 10, 2020

(54) APPARATUS AND METHODS FOR VECTOR OPERATIONS

(71) Applicant: Cambricon Technologies Corporation Limited, Beijing (CN)

(72) Inventors: Tao Luo, Beijing (CN); Tian Zhi, Beijing (CN); Shaoli Liu, Beijing (CN); Tianshi Chen, Beijing (CN); Yunji Chen, Beijing (CN)

(73) Assignee: CAMBRICON TECHNOLOGIES CORPORATION LIMITED, Beijing (CN)

( * ) Notice: Subject to any disclaimer, the term of this patent is extended or adjusted under 35 U.S.C. 154(b) by 0 days.

(21) Appl. No.: 16/172,049

(22) Filed: Oct. 26, 2018

(65) Prior Publication Data

US 2020/0097520 A1 Mar. 26, 2020

Related U.S. Application Data

(63) Continuation-in-part of application No. PCT/CN2016/081526, filed on May 10, 2016.

(51) Int. Cl.
*G06F 17/16* (2006.01)
*G06F 9/30* (2018.01)
*G06N 3/04* (2006.01)

(52) U.S. Cl.
CPC ............ *G06F 17/16* (2013.01); *G06F 9/3001* (2013.01); *G06N 3/04* (2013.01)

(58) Field of Classification Search
CPC .......... G06F 17/16; G06F 9/30; G06F 9/3001; G06F 9/30036; G06F 9/30032; G06F 9/30043; G06N 3/04

USPC .......................................... 708/620, 520, 626
See application file for complete search history.

(56) References Cited

U.S. PATENT DOCUMENTS

| 6,195,747 B1 * | 2/2001 | Hou ................. G06F 13/16 712/2 |
| 10,261,789 B2 * | 4/2019 | Reid .................... G06F 9/30043 |
| 2018/0197067 A1 * | 7/2018 | Mody ..................... G06F 7/52 |

FOREIGN PATENT DOCUMENTS

| CN | 102156637 A | 8/2011 |
| CN | 102262525 A | 11/2011 |
| TW | 201514850 A | 4/2015 |
| WO | WO 2017/185405 A1 | 11/2017 |

OTHER PUBLICATIONS

Machine translation CN 102156637 (A).*
201610266970.5, Office Action, dated Jan. 6, 2020, 9 pages. (no English translation).
T. Chen, et al., "A Small-Footprint Accelerator for Large-Scale Neural Networks", ACM Transactions on Computer Systems, vol. 33, No. 2, Article 6, May 2015, 27 pages.
(Continued)

*Primary Examiner* — Tan V Mai
(74) *Attorney, Agent, or Firm* — Getech Law LLC; Jun Ye (57) ABSTRACT

Aspects for vector operations in neural network are described herein. The aspects may include a vector caching unit configured to store a first vector and a second vector. The first vector may include one or more first elements and the second vector may include one or more second elements. The aspects may further include a computation module configured to calculate a cross product between the first vector and the second vector in response to an instruction.

37 Claims, 4 Drawing Sheets

(56) References Cited

OTHER PUBLICATIONS

Z. Du, et al., "An Accelerator for High Efficient Vision Processing", IEEE Transactions on Computer-aided Design of Integrated Circuits and System, vol. 36, No. 2, Feb. 2017, pp. 227-240.
S. Liu, et al., "Cambricon: An Instruction Set Architecture for Neural Networks", 2016 ACM/IEEE 43rd Annual International Symposium on Computer Architecture, Oct. 12, 2016, pp. 393-405.
S. Zhang, et al., "Cambricon-X An Accelerator for Sparse Neural Networks", The 49th Annual IEEE/ACM International Symposium on Microarchitecture Article No. 20, Oct. 15, 2016, 12 pages.
Y. Chen, et al., "DaDianNao: A Machine-Learning Supercomputer", 2014 47th Annual IEEE/ACM International Symposium on Microarchitecture, Dec. 13, 2014, pp. 609-622.
T. Luo, et al., "DaDianNao: A Neural Network Supercomputer", IEEE Transaction on Computers, vol. 66, No. 1, Jan. 2017, pp. 73-88.
T. Chen, et al., "DianNao: A Small-Footprint High-Throughput Accelerator for Ubiquitous Machine-Learning", ASPLOS '14, Proceedings of the 19th international conference on Architectural support for programming languages and operating systems, Feb. 24, 2014, pp. 269-283.
Y. Chen, et al., "DianNao Family: Energy-Efficient Hardware Accelerators for Machine Learning", Communications of the ACM, vol. 59, No. 11, Nov. 2016, pp. 105-112.
D. Liu, et al., "PuDianNao: A Polyvalent Machine Learning Accelerator", ASPLOS '15 Proceedings of the Twentieth International Conference on Architectural Support for Programming Languages and Operating Systems, Mar. 14, 2015, pp. 369-381.
Z. Du, et al., "ShiDianNao: Shifting Vision Processing Closer to the Sensor", ISCA '15 Proceedings of the 42nd Annual International Symposium on Computer Architecture, Jun. 13, 2015, pp. 92-104.
201610266970.5—Office Action, dated Apr. 22, 2019, 8 pages. (no English translation).
PCT/CN2016/081526—International Search Report, dated Jan. 25, 2017, 9 pages. (no English translation).
EP16899916.7, Office Action dated May 8, 2020, 7 pages.

* cited by examiner

APPARATUS AND METHODS FOR VECTOR OPERATIONS

CROSS-REFERENCE TO RELATED APPLICATIONS

The present invention is a continuation-in-part of PCT Application No. PCT/CN2016/081526, filed on May 10, 2016, which claims priority to commonly owned CN application number 201610266970.5, filed on Apr. 26, 2016. The entire contents of each of the aforementioned applications are incorporated herein by reference.

BACKGROUND

Multilayer neural networks (MNN) are widely applied to the fields such as pattern recognition, image processing, functional approximation and optimal computation. In recent years, due to the higher recognition accuracy and better parallelizability, multilayer artificial neural networks have received increasing attention by academic and industrial communities. More specifically, various operations for vectors may be performed frequently in deep learning processes in MMNs.

A known method to perform various operations for vectors in a multilayer artificial neural network is to use a general-purpose processor. However, one of the defects of the method is low performance of a single general-purpose processor which cannot meet performance requirements for usual multilayer neural network operations with respect to a vector with a large number of elements.

Another known method to perform operations for vectors of the multilayer artificial neural network is to use a graphics processing unit (GPU). Such a method uses a general-purpose register file and a general-purpose stream processing unit to execute general purpose single-instruction-multiple-data (SIMD) instructions to support the algorithms in MNNs. However, since GPU only contains rather small on-chip caching, then data of the vector elements may be repeatedly moved from the off-chip, and off-chip bandwidth becomes a main performance bottleneck, causing huge power consumption.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One example aspect of the present disclosure provides an example apparatus for vector operations in a neural network. The example apparatus may include a vector caching unit configured to store a first vector and a second vector. The first vector may include one or more first elements and the second vector may include one or more second elements. The example apparatus may further include a computation module configured to calculate a cross product between the first vector and the second vector in response to an instruction.

The example aspect of the present disclosure also provides an example method for vector operations in a neural network. The example method may include storing, by a vector caching unit, a first vector and a second vector, wherein the first vector includes one or more first elements, and wherein the second vector include one or more second elements; and calculating, by a computation module, a cross product between the first vector and the second vector in response to an instruction.

To the accomplishment of the foregoing and related ends, the one or more aspects comprise the features herein after fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purpose of explanation, numerous specific details are set forth in order to provide a thorough understanding of one or more aspects. It may be evident, however, that such aspect(s) may be practiced without these specific details.

In the present disclosure, the term "comprising" and "including" as well as their derivatives mean to contain rather than limit; the term "or", which is also inclusive, means and/or.

In this specification, the following various embodiments used to illustrate principles of the present disclosure are only for illustrative purpose, and thus should not be understood as limiting the scope of the present disclosure by any means. The following description taken in conjunction with the accompanying drawings is to facilitate a thorough understanding to the illustrative embodiments of the present disclosure defined by the claims and its equivalent. There are specific details in the following description to facilitate understanding. However, these details are only for illustrative purpose. Therefore, persons skilled in the art should understand that various alternation and modification may be made to the embodiments illustrated in this description without going beyond the scope and spirit of the present disclosure. In addition, for clear and concise purpose, some known functionality and structure are not described. Besides, identical reference numbers refer to identical function and operation throughout the accompanying drawings.

A vector may refer to one or more values formatted in a one-dimensional data structure. The values included in a vector may be referred to as elements. The number of the elements in the vector may be referred to as a length of the vector. Various types of vector operations may be performed in a neural network. For example, a vector operation for calculating a cross product between two vectors.

Figure 1:
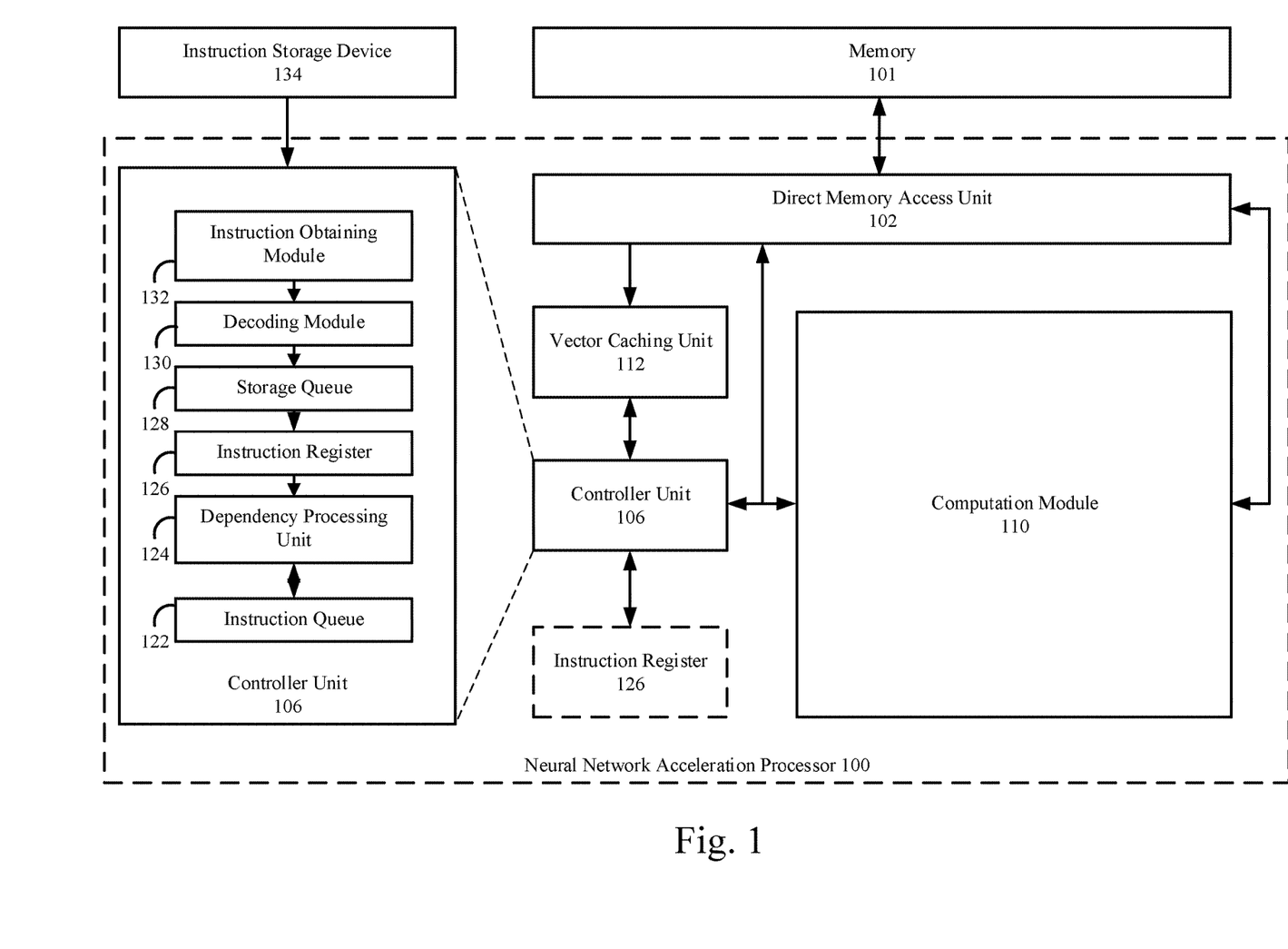
FIG. 1 illustrates a block diagram of an example neural network acceleration processor by which vector operations may be implemented in a neural network.

FIG. 1 illustrates a block diagram of an example neural network acceleration processor by which vector operations may be implemented in a neural network. As depicted, the example neural network acceleration processor 100 may include an instruction caching unit 104, a controller unit 106, a direct memory access unit 102, a computation module 110, and a vector caching unit 112. Any of the above-mentioned components or devices may be implemented by a hardware circuit (e.g., application specific integrated circuit (ASIC), Coarse-grained reconfigurable architectures (CGRAs), field-programmable gate arrays (FPGAs), analog circuits, memristor, etc.).

In some examples, a vector cross product instruction may originate from an instruction storage device 134 to the controller unit 106. An instruction obtaining module 132 may be configured to obtain a vector cross product instruction from the instruction storage device 134 and transmit the instruction to a decoding module 130.

the data of the previous instruction that is being executed. This instruction may be stored in the storage queue module 122 until it has no dependency relationship on the data with the previous instruction that has not finished executing. If the dependency relationship does not exist, the controller unit 106 may be configured to decode one of the instructions into micro-instructions for controlling operations of other modules including the direct memory access unit 102 and the computation module 110.

For example, the controller unit 106 may receive a vector cross product (VCP) instruction that includes a starting address of the first vector in the instruction register 126, a length of the first vector, a starting address of the second vector in the instruction register 126, a length of the second vector, and an address for an output result in the vector caching unit 112. According to the VCP instruction, the direct memory access unit 102 may be configured to retrieve the first vector and the second vector from an external storage device, e.g., a memory 101, according to the starting addresses in the VCP instruction.

The VCP instruction may be formatted as follows and may be stored in the instruction caching unit 104.

|  | Register 0 | Register 1 | Register 2 | Register 3 | Register 4 |
| --- | --- | --- | --- | --- | --- |
| VCP | Starting address of the first vector | Length of the first vector | Starting address of the second vector | Length of the second vector | Output result |

The decoding module 130 may be configured to decode the vector cross product instruction. The vector cross product instruction may include one or more operation fields that indicate parameters for executing the instruction. The parameters may refer to identification numbers of different registers ("register ID" hereinafter) in the instruction register 126. Thus, by modifying the parameters in the instruction register 126, the neural network acceleration processor 100 may modify the instruction without receiving new instructions. The decoded instruction may be transmitted by the decoding module 130 to an instruction queue module 128. In some other examples, the one or more operation fields may store immediate values such as addresses in the memory 101 and a scalar value, rather than the register IDs.

The instruction queue module 128 may be configured to temporarily store the received instruction and/or one or more previously received instructions. Further, the instruction queue module 128 may be configured to retrieve information according to the register IDs included in the instruction from the instruction register 126.

For example, the instruction queue module 128 may be configured to retrieve information corresponding to operation fields in the instruction from the instruction register 126. Information for the operation fields in a vector cross product instruction, for example, may include a first address of a first vector, a length of the first vector, a second address of a second vector, and a length of the second vector. As depicted, in some examples, the instruction register 126 may be implemented by one or more registers external to the controller unit 106.

Once the relevant values are retrieved, the instruction may be sent to a dependency processing unit 124. The dependency processing unit 124 may be configured to determine whether the instruction has a dependency relationship with Hereinafter, a caching unit (e.g., the vector caching unit 112 etc.) may refer to an on-chip caching unit integrated in the neural network acceleration processor 100, rather than other storage devices in memory 101 or other external devices. In some examples, the on-chip caching unit may be implemented as a register file, an on-chip buffer, an on-chip Static Random Access Memory (SRAM), or other types of on-chip storage devices that may provide higher access speed than the external memory. In some other examples, the instruction register 126 may be implemented as a scratchpad memory, e.g., Dynamic random-access memory (DRAM), embedded DRAM (eDRAM), memristor, 3D-DRAM, non-volatile memory, etc.

Figure 2:
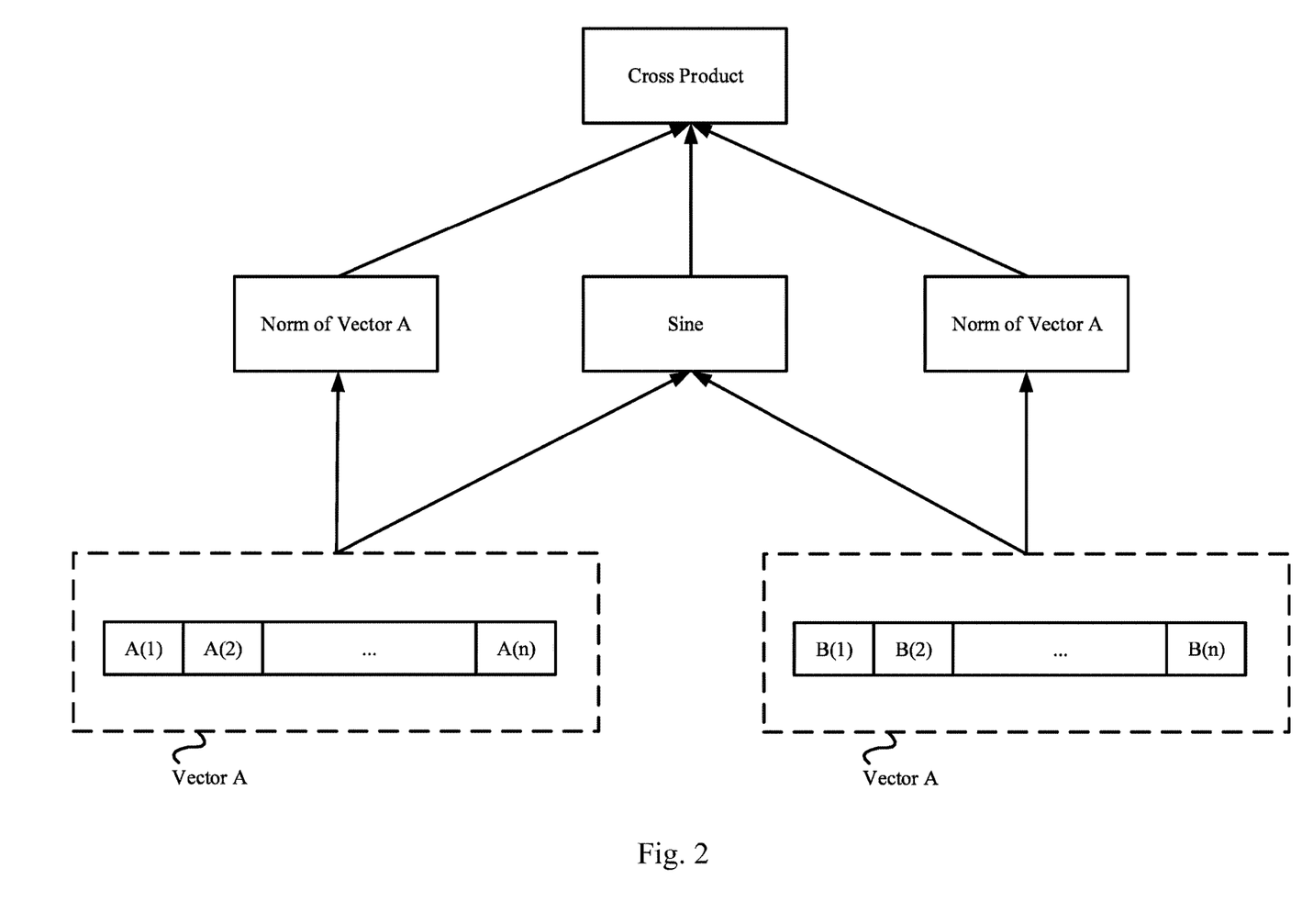
FIG. 2 illustrates an example vector operation process that may be performed by the example neural network acceleration processor.

FIG. 2 illustrates an example vector operation process that may be performed by the example neural network acceleration processor.

As depicted, in response to a VCP instruction, the computation module 110 may be configured to calculate a cross product between a first vector ("Vector A") and a second vector ("Vector B"). The first vector may include one or more elements respectively denoted as $A(1), A(2), \ldots A(n)$. The second vector may include one or more elements respectively denoted as $B(1), B(2), \ldots B(n)$. The cross product between Vector A and Vector B may be represented as:

$$|\text{Vector } A| \cdot |\text{Vector } B| \cdot \text{Sin}(\text{Vector } A, \text{Vector } B)$$

In response to the VCP instruction, the computation module 110 may be configured to first calculate a norm of the Vector A and a norm of the Vector B. Further, the computation module 110 may be configured to calculate a sine vector between the Vector A and the Vector B. In an example that Vector A and Vector B may be respectively represented as $(x_1, y_1, z_1)$ and $(x_2, y_2, z_2)$, the sine vector may be calculated as $((y_1z_2-y_2z_1), -(x_1z_2-x_2z_1), (x_1y_2-x_2y_1))$. Further, the computation module 110 may be configured to multiply the norm of the Vector A, the norm of the Vector B, and the sine vector to generate the cross product as an output result. The output result may be stored into the vector caching unit 112.

Figure 3:
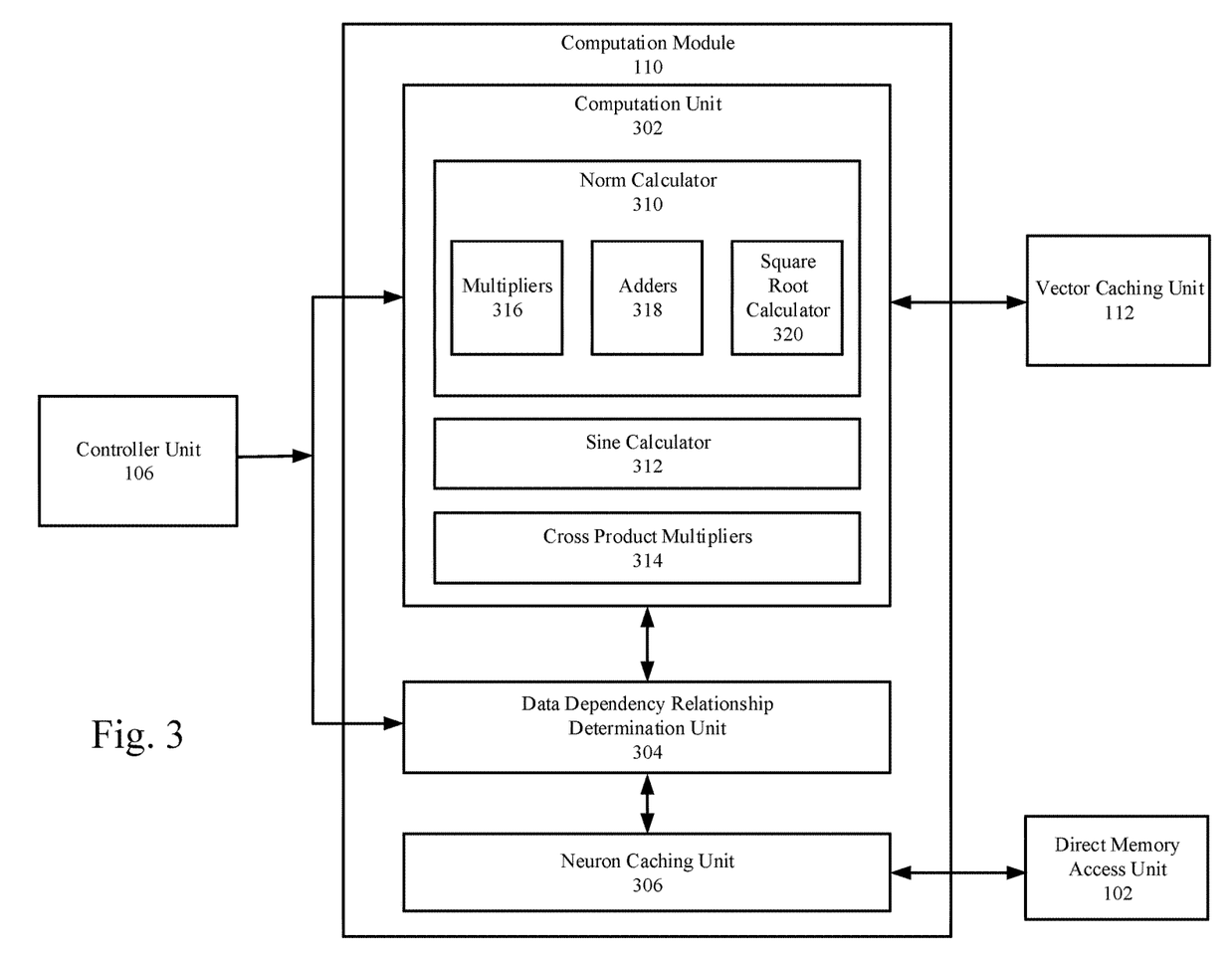
FIG. 3 illustrates an example computation module in the example neural network acceleration processor by which vector operations may be implemented in a neural network.

FIG. 3 illustrates an example computation module 110 in the example neural network acceleration processor by which vector operations may be implemented in a neural network.

As depicted, the computation module 110 may include a computation unit 302, a data dependency relationship determination unit 304, a neuron caching unit 306. The computation unit 302 may further include a norm calculator 310, a sine calculator, and one or more cross product multipliers 314. The components of the computation module 110 may be implemented as hardware, software, firmware, or any combination thereof. Other structure may also be implemented to perform similar functions for calculating a vector cross product.

The data dependency relationship determination unit 304 may be configured to perform data access operations (e.g., reading or writing operations) on the caching units including the neuron caching unit 306 during the computation process. The data dependency relationship determination unit 304 may be configured to prevent conflicts in reading and writing of the data in the caching units. For example, the data dependency relationship determination unit 304 may be configured to determine whether there is dependency relationship in terms of data between a micro-instruction which to be executed and a micro-instruction being executed. If no dependency relationship exists, the micro-instruction may be allowed to be executed; otherwise, the micro-instruction may not be allowed to be executed until all micro-instructions on which it depends have been executed completely. The dependency relationship may be determined when a target operation range of the micro-instruction to be executed overlaps a target operation range of a micro-instruction being executed. For example, all micro-instructions sent to the data dependency relationship determination unit 304 may be stored in an instruction queue within the data dependency relationship determination unit 304. The instruction queue may indicate the relative priorities of the stored micro-instructions. In the instruction queue, if the target operation range of reading data by a reading instruction conflicts with or overlaps the target operation range of writing data by a writing instruction of higher priority in the front of the instruction queue, then the reading instruction may not be executed until the writing instruction is executed.

The neuron caching unit 306 may be configured to store the elements in the Vector A and the Vector B.

The computation unit 302 may be configured to receive the micro-instructions decoded from the vector operation instruction from the controller unit 106. In the example that the computation unit 302 receives micro-instructions decoded from a VCP instruction, the norm calculator 310 may be configured to calculate the norm of the Vector A and the norm of the Vector B. A norm of the Vector A may be represented as: $\sqrt{A(1)^2+A(2)^2+A(3)^2+...+A(n)^2}$. Similarly, a norm of the Vector B may be represented as: $\sqrt{B(1)_2+B(2)^2+B(3)^2+...+B(n)^2}$.

In some example, the norm calculator 310 may further include one or more multipliers 316, one or more adders 318, and a square root calculator 320. The one or more multiplier 316 may be configured to calculate a square for each element in the Vector A, e.g., $A(1)^2, A(2)^2, A(3)^2 ... A(n)^2$ and a square for each element in the Vector B, e.g., $B(1)^2, B(2)^2, B(3)^2 ... B(n)^2$. The adders 318 may be configured to add the squares to generate an addition result, e.g., $A(1)^2+A(2)^2+A(3)^2+ ... +A(n)^2$ and $B(1)^2+B(2)^2+B(3)^2+ ... +B(n)^2$. The square root calculator 320 may be configured to calculate a square root respectively for the addition results as the respective norm of the Vector A and the Vector B.

In addition, the sine calculator 312 may be configured to calculate a sine vector between the Vector A and the Vector B. The cross product multipliers 314 may be configured to multiply the norm of the Vector A, the norm of the Vector B, and the sine vector to generate the cross product.

In some examples, the norm calculator 310, the sine calculator 312, and the cross product multipliers 314 may be directly connected. That is, process results from the norm calculator 310 may be directly transmitted to the sine calculator 312 without being temporarily stored at the neuron caching unit 306. Similarly, process results from the sine calculator 312 may be directly transmitted to the cross product multipliers 314 without being temporarily stored at the neuron caching unit 306.

Figure 4:
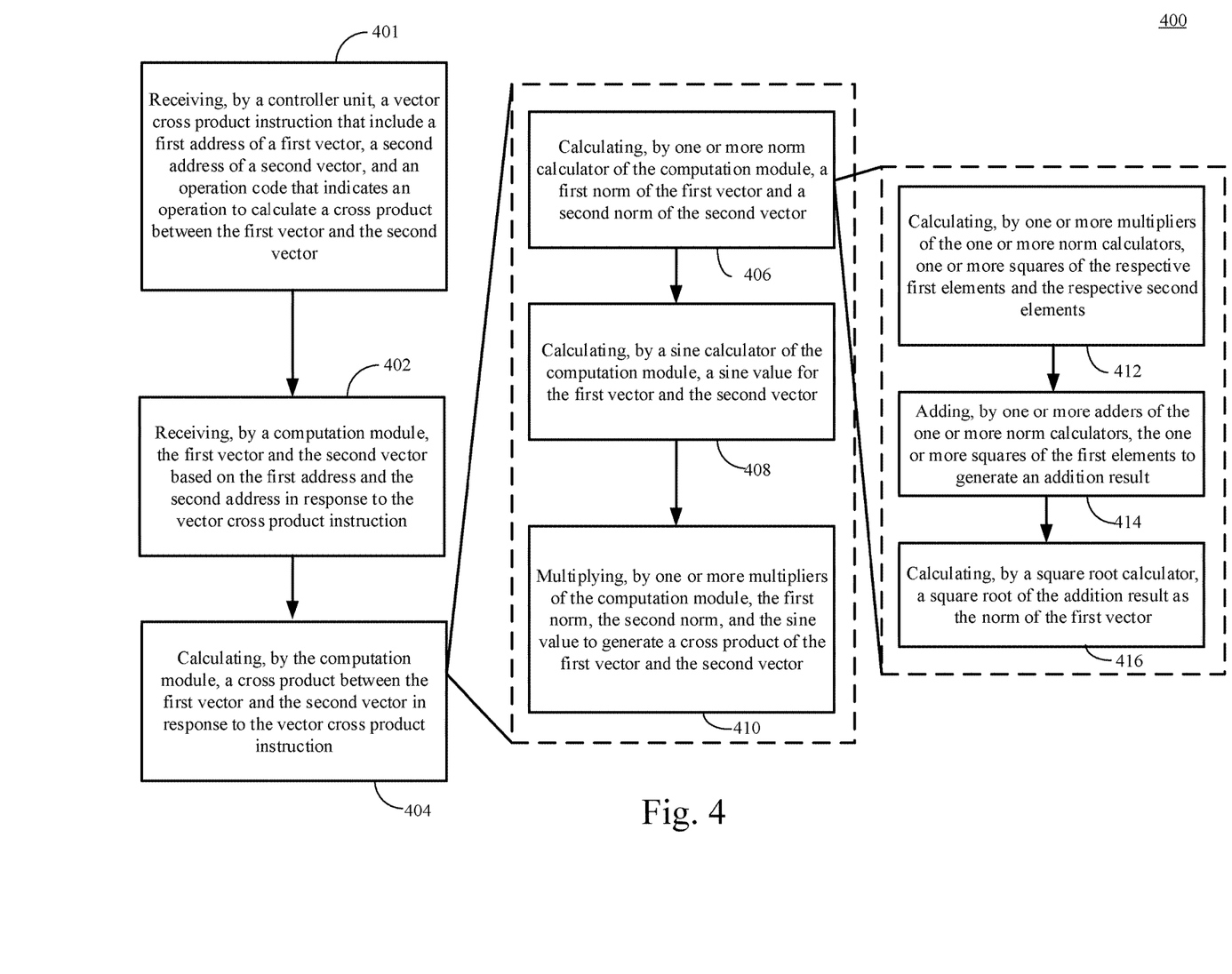
FIG. 4 illustrates a flow chart of an example method for performing vector operations between two vectors in a neural network.

FIG. 4 illustrates a flow chart of an example method 400 for performing logical operations between two vectors in a neural network. The method 400 may be performed by one or more components the apparatus of FIGS. 1 and 3. Optional or alternative operations may be shown in dash-lined blocks.

At block 401, the example method 400 may include receiving, by a controller unit, a vector cross product instruction that include a first address of a first vector, a second address of a second vector, and an operation code that indicates an operation to calculate a cross product between the first vector and the second vector. For example, the controller unit 106 may receive a vector cross product (VCP) instruction that includes a starting address of the first vector in the instruction register 126, a length of the first vector, a starting address of the second vector in the instruction register 126, a length of the second vector, and an address for an output result in the vector caching unit 112.

At block 402, the example method 400 may include receiving, by a computation module, the first vector and the second vector based on the first address and the second address in response to the vector cross product instruction. For example, the computation module 110 may be configured to receive the Vector A and the Vector B. The Vector A may include elements respectively denoted as $A(1), A(2), ... A(n)$. The Vector B may include one or more elements respectively denoted as $B(1), B(2), ... B(n)$.

At block 404, the example method 400 may include calculating, by the computation module, a cross product between the first vector and the second vector in response to the vector cross product instruction. For example, the computation module 110 may be configured calculate a cross product for the Vector A and the Vector B. Block 404 may further include blocks 406, 408, and 410.

At block 406, the example method 400 may include calculating, by one or more norm calculator of the computation module, a first norm of the first vector and a second norm of the second vector. For example, the norm calculator 310 may be configured to calculate the norm of the Vector A and the norm of the Vector B. A norm of the Vector A may be represented as: $\sqrt{A(1)^2+A(2)^2+A(3)^2+...+A(n)^2}$. Similarly, a norm of the Vector B may be represented as: $\sqrt{B(1)^2+B(2)^2+B(3)^2+...+B(n)^2}$. Block 406 may further include blocks 412, 414, and 416.

At block 408, the example method 400 may include calculating, by a sine calculator of the computation module, a sine vector for the first vector and the second vector. For example, the sine calculator 312 may be configured to calculate a sine vector between the Vector A and the Vector B.

At block 410, the example method 400 may include multiplying, by one or more multipliers of the computation module, the first norm, the second norm, and the sine vector to generate a cross product of the first vector and the second vector. For example, The cross product multipliers 314 may be configured to multiply the norm of the Vector A, the norm of the Vector B, and the sine vector to generate the cross product.

At block 412, the example method 400 may include calculating, by one or more multipliers of the one or more norm calculators, one or more squares of the respective first elements and the respective second elements. For example, The one or more multiplier 316 may be configured to calculate a square for each element in the Vector A, e.g., $A(1)^2, A(2)^2, A(3)^2 \ldots A(n)^2$ and a square for each element in the Vector B, e.g., $B(1)^2, B(2)^2, B(3)^2 \ldots B(n)^2$.

At block 414, the example method 400 may include adding, by one or more adders of the one or more norm calculators, the one or more squares of the first elements to generate an addition result. For example, the adders 318 may be configured to add the squares to generate an addition result, e.g., $A(1)^2+A(2)^2+A(3)^2+ \ldots +A(n)^2$ and $B(1)^2+B(2)^2+B(3)^2+ \ldots +B(n)^2$.

At block 416, the example method 400 may include calculating, by a computation module, a cross product between the first vector and the second vector in response to an instruction. For example, the square root calculator 320 may be configured to calculate a square root respectively for the addition results as the respective norm of the Vector A and the Vector B.

The process or method described in the above accompanying figures can be performed by process logic including hardware (for example, circuit, specific logic etc.), firmware, software (for example, a software being externalized in non-transitory computer-readable medium), or the combination of the above two. Although the process or method is described above in a certain order, it should be understood that some operations described may also be performed in different orders. In addition, some operations may be executed concurrently rather than in order.

In the above description, each embodiment of the present disclosure is illustrated with reference to certain illustrative embodiments. Apparently, various modifications may be made to each embodiment without going beyond the wider spirit and scope of the present disclosure presented by the affiliated claims. Correspondingly, the description and accompanying figures should be understood as illustration only rather than limitation. It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

We claim:

1. An apparatus for vector operations in a neural network, comprising:
   a controller unit configured to receive a vector cross product instruction that indicates a first address of a first vector, a second address of a second vector, and an operation code that indicates an operation to calculate a cross product between the first vector and the second vector; and
   a computation module configured to receive the first vector and the second vector based on the first address and the second address in response to the vector cross product instruction,
      wherein the first vector includes one or more first elements,
      wherein the second vector includes one or more second elements,
      wherein the computation module is configured to calculate a cross product between the first vector and the second vector in response to the vector cross product instruction, and
      wherein the computation module comprises one or more norm calculator configured to calculate a first norm of the first vector and a second norm of the second vector.

2. The apparatus of claim 1, wherein the vector cross product instruction further includes a first length of the first vector, and wherein the computation module is configured to receive the first vector based on the first address and the first length.

3. The apparatus of claim 1, wherein the vector cross product instruction further includes a second length of the second vector, and wherein the computation module is configured to receive the second vector based on the second address and the second length.

4. The apparatus of claim 1, wherein the vector cross product instruction includes one or more register IDs that identify one or more registers configured to store the first address of the first vector, the second address of the second vector, a first length of the first vector, and a second length of the second vector.

5. The apparatus of claim 1, wherein the computation module comprises a sine calculator configured to calculate a sine vector for the first vector and the second vector.

6. The apparatus of claim 5, wherein the first norm of the first vector and the second norm of the second vector are directly transmitted to the sine calculator.

7. The apparatus of claim 5, wherein the computation module comprises one or more cross product multipliers configured to multiply the first norm, the second norm, and the sine vector to generate a cross product of the first vector and the second vector.

8. The apparatus of claim 7, wherein the first norm, the second norm, and the sine vector are directly transmitted from the norm calculator and the sine calculator to the cross product multipliers.

9. The apparatus of claim 1, wherein the one or more norm calculators comprise one or more multipliers configured to calculate one or more squares of the respective first elements and the respective second elements.

10. The apparatus of claim 1, wherein the one or more norm calculators further comprise:
one or more adders configured to add the one or more squares of the first elements to generate an addition result; and
a square root calculator configured to calculate a square root of the addition result as the norm of the first vector.

11. The apparatus of claim 1, wherein the one or more norm calculators further comprise:
one or more adder configured to add the one or more squares of the second elements to generate an addition result; and
a square root calculator configured to calculate a square root of the addition result as the norm of the second vector.

12. The apparatus of claim 1, further comprising one or more registers configured to store the first address of the first vector, a length of the first vector, the second address of the second vector, a length of the second vector, and an address for an output result.

13. The apparatus of claim 1, wherein the controller unit comprises an instruction obtaining module configured to obtain the vector cross product instruction from an instruction storage device.

14. The apparatus of claim 13, wherein the controller unit further comprises a decoding module configured to decode the vector cross product instruction into one or more micro-instructions.

15. The apparatus of claim 14, wherein the controller unit further comprises an instruction queue module configured to temporarily store the vector cross product instruction and one or more previously received instructions, and retrieve information corresponding to operation fields in the vector cross product instruction.

16. The apparatus of claim 15, wherein the controller unit further comprises an instruction register configured to store the information corresponding to the operation fields in the vector cross product instruction.

17. The apparatus of claim 16, wherein the controller unit further comprises a dependency processing unit configured to determine whether the vector cross product instruction has a dependency relationship with the one or more previously received instructions.

18. The apparatus of claim 17, wherein the controller unit further comprises a storage queue module configured to store the vector cross product instruction while the dependency processing unit is determining whether the vector cross product instruction has the dependency relationship with the one or more previously received instructions.

19. A method for vector operations in a neural network, comprising:
receiving, by a controller unit, a vector cross product instruction that indicates a first address of a first vector, a second address of a second vector, and an operation code that indicates an operation to calculate a cross product between the first vector and the second vector;
receiving, by a computation module, the first vector and the second vector based on the first address and the second address in response to the vector cross product instruction,
wherein the first vector includes one or more first elements, and
wherein the second vector includes one or more second elements;
calculating, by the computation module, a cross product between the first vector and the second vector in response to the vector cross product instruction, and
calculating, by one or more norm calculator of the computation module, a first norm of the first vector and a second norm of the second vector.

20. The method of claim 19, wherein the vector cross product instruction further includes a first length of the first vector, and wherein the computation module is configured to receive the first vector based on the first address and the first length.

21. The method of claim 19, wherein the vector cross product instruction further includes a second length of the second vector, and wherein the computation module is configured to receive the second vector based on the second address and the second length.

22. The method of claim 19, wherein the vector cross product instruction includes one or more register IDs that identify one or more registers configured to store the first address of the first vector, the second address of the second vector, a first length of the first vector, and a second length of the second vector.

23. The method of claim 19, further comprising calculating, by a sine calculator of the computation module, a sine vector for the first vector and the second vector.

24. The method of claim 23, further comprising directly transmitting the first norm of the first vector and the second norm of the second vector to the sine calculator.

25. The method of claim 23, further comprising multiplying, by one or more cross product multipliers of the computation module, the first norm, the second norm, and the sine vector to generate a cross product of the first vector and the second vector.

26. The method of claim 25, further comprising directly transmitting the first norm, the second norm, and the sine vector from the norm calculator and the sine calculator to the cross product multipliers.

27. The method of claim 23, further comprising calculating, by one or more multipliers of the one or more norm calculators, one or more squares of the respective first elements and the respective second elements.

28. The method of claim 27, further comprising:
adding, by one or more adders of the one or more norm calculators, the one or more squares of the first elements to generate an addition result; and
calculating, by a square root calculator, a square root of the addition result as the norm of the first vector.

29. The method of claim 28, further comprising:
adding, by one or more adders of the one or more norm calculators, the one or more squares of the second elements to generate an addition result; and
calculating, by a square root calculator, a square root of the addition result as the norm of the second vector.

30. The method of claim 19, further comprising storing, by one or more registers, the first address of the first vector, a length of the first vector, the second address of the second vector, a length of the second vector, and an address for an output result.

31. The method of claim 19, further comprising retrieving, by a direct memory access unit, the first vector and the second vector from a storage device based on the starting address of the first vector, the length of the first vector, the starting address of the second vector, and the length of the second vector.

32. The method of claim 31, further comprising obtaining, by an instruction obtaining module of the controller unit, the vector cross product instruction from an instruction storage device.

33. The method of claim 32, further comprising decoding, by a decoding module of the controller unit, the vector cross product instruction into one or more micro-instructions.

34. The method of claim 33, further comprising temporarily storing, by an instruction queue module of the controller unit, the vector cross product instruction and one or more previously received instructions, and retrieve information corresponding to operation fields in the vector cross product instruction.

35. The method of claim 34, further comprising storing, by an instruction register of the controller unit, the information corresponding to the operation fields in the vector cross product instruction.

36. The method of claim 35, further comprising determining, by a dependency processing unit of the controller unit, whether the vector cross product instruction has a dependency relationship with the one or more previously received instructions.

37. The method of claim 36, further comprising storing, by a storage queue module of the controller unit, the vector cross product instruction while the dependency processing unit is determining whether the vector cross product instruction has the dependency relationship with the one or more previously received instructions.

* * * * *